United States Patent [19]

Lin et al.

[11] Patent Number: 5,248,726

[45] Date of Patent: Sep. 28, 1993

[54] POLYMER BLENDS OF POLYAMIDES, STYRENIC RESINS, AND IMPACT MODIFIERS

[75] Inventors: Jen-Lien Lin; Hsin-Ching Kao, both of Hsin Chu; Mao-Song Lee, Hsin Chu; Jia-Pang Hsu, Chang Hua; Ting K. Wu, Taipei, all of Taiwan

[73] Assignee: Industrial Technology Research Institute, Hsinchu, Taiwan

[21] Appl. No.: 571,078

[22] Filed: Aug. 22, 1990

[51] Int. Cl.$^5$ ............................................. C08L 77/00
[52] U.S. Cl. ................................... 525/66; 525/179
[58] Field of Search .......................... 525/179, 66

[56] References Cited

U.S. PATENT DOCUMENTS

| | | | |
|---|---|---|---|
| 4,174,358 | 11/1979 | Epstein | 525/183 |
| 4,429,076 | 1/1984 | Saito et al. | 525/66 |
| 4,496,690 | 1/1985 | Grant et al. | 525/66 |
| 4,740,552 | 4/1988 | Grant et al. | 525/66 |
| 4,824,905 | 4/1989 | Saeki et al. | 525/66 |
| 5,032,644 | 7/1991 | Biletch et al. | 525/66 |
| 5,089,557 | 2/1992 | Henton et al. | 525/66 |

FOREIGN PATENT DOCUMENTS 0202214 11/1986 European Pat. Off.

*Primary Examiner*—Ana L. Carrillo
*Attorney, Agent, or Firm*—Flehr, Hohbach, Test, Albritton & Herbert

[57] ABSTRACT

Polymer blend compositions having improved toughness which comprise 99-1 weight percent polyamide resin, 1-99 weight percent ABS resin, and 1-100 phr of carboxylated nitrile rubbers, based upon the total weight of the polyamide and ABS resin.

6 Claims, No Drawings

POLYMER BLENDS OF POLYAMIDES, STYRENIC RESINS, AND IMPACT MODIFIERS

The present invention is directed to novel polymer compositions which comprise a mixture of polyamide compounds, styrenic resins, and interfacial agents that improve the compatibility between the polyamide compound and styrenic resin, thereby enhancing the impact resistance of the resultant polymer composition.

BACKGROUND OF THE INVENTION

Polyamide resin, also known as nylon, exhibits excellent chemical resistance, lubricity and toughness, but inferior notched impact resistance and dimensional stability. This limits its field of application. Polyamide resins are used for a variety of products, including football face guards, hammer handle gears, sprockets, journal bearings, casters, package strapping, automobile dome lights, power tool housings, automotive parts, business equipment and other industrial and home applications. Because of its widespread utility, numerous efforts have been made to improve the impact resistance of polyamide.

U.S. Pat. No. 4,174,358 discloses polyolefin rubber grafted with organic carboxylic acid or anhydride using an interfacial agent to increase the compatibility between the polyamide and polyolefin rubber. Increasing the compatibility between these compounds improved the impact strength of their blends. However, grafting of these compounds using an interfacial agent resulted in a lowering of the heat distortion temperature, making the resultant composition disadvantageous.

U.S. Pat. No. 4,496,690 discloses modification of acrylonitrile-butadiene-styrene (ABS) with acrylamide as an interfacial agent for ABS/nylon blends to improve impact strength, heat distortion temperature and dimensional stability of the polymer blends. However, products prepared according to this method exhibited poor cold impact strength (0 degrees, ⅛ inch, notched impact strength of 1 ft-lb/in.)

European Patent No. 202,214 discloses the use of maleic anhydride modified-styrene-acrylonitrile copolymer as the interfacial agent for ABS/nylon blends. This process had limitations in its formulation capacity as well. Where the carboxy (anhydride) content increased by 1 mole percent or decreased by 0.5 mole percent, the impact strength of the polymer blends decreased by one-half and the product yellowed.

Accordingly, it is an object of the present invention to provide polymer blend compositions which exhibit improved impact resistance and dimensional stability.

It is a further object of the present invention to provide novel polymer compositions which employ interfacial agents to improve the compatibility between polyamide and polymer resins, thereby enhancing the impact resistance of the resultant polymer composition. It is still another object of the present invention to provide novel polymer blend compositions with improved impact resistance by using as interfacial agents either carboxy (anhydride)-containing acrylonitrile-butadiene copolymer or carboxy (anhydride)-containing styrene-olefin block copolymer.

It is yet another object of the present invention to provide novel polymer blend compositions of a Nylon-/ABS polyblend with improved impact resistance by using carboxylated nitrile rubbers.

The benefits of using the carboxylated nitrile rubbers in a polyblend of Nylon/ABS include an increase in the compatibility between the Nylon and ABS phase and an impact modification of the Nylon/ABS polyblend.

SUMMARY OF THE INVENTION

The present invention provides novel polymer blend compositions which comprise mixtures of polyamide compounds, styrenic resins, and interfacial agents that improve the compatibility between the polyamide and styrenic resin, thereby enhancing impact resistance of the resultant polymer composition The composition preferably comprises from about 99 weight percent to about 1 weight percent polyamide resin, from about 1 weight percent to about 99 weight percent styrenic resin, and from about 1 part to about 100 parts per hundred resin ("phr") interfacial agent based upon the total weight of the polyamide and styrenic resin. The interfacial agent preferably consists of carboxy (anhydride) containing acrylonitrile-butadiene copolymer or carboxy (anhydride) containing styrene-olefin block copolymer.

The present invention is also directed to a process for preparing the novel polymer compositions of the present invention. The process includes mixing polyamide resin in the range of about 99 weight percent to about 1 weight percent, together with styrenic resin in the range from about 1 weight percent to about 99 weight percent and 1 to 100 phr of one of the interfacial agents of the present invention, described above. The mixture is then dried by conventional means and extruded. The extruding step is preferably performed at a temperature in the range from about 220° C. to about 250° C.

In the accompanying tables:

Table 1 shows the effect of carboxy (anhydride)-containing acrylonitrile-butadiene copolymer interfacial agent a carboxylated nitrile rubber, on the notched impact strengths of nylon/styrenic resin polyblends in Examples 1-12. Table 1 also shows the notched impact strengths of nylon/styrenic resin polyblends without interfacial agent in Examples 1-4.

Table 2 shows the effect of carboxy containing styrene-olefin block copolymer interfacial agent on the impact strengths of nylon/styrenic resin polyblends in Examples 13-24.

Table 3 shows the effect of carboxy-containing styrene-olefin block copolymer using interfacial agent with different carboxy contents and styrene-to-olefin ratios on impact strengths of nylon/styrenic resin polyblend compositions in Examples 25-36.

Table 4 shows the effect of carboxy-containing styrene-olefin block copolymer interfacial agent on the impact strengths of various grades of nylon/styrenic resin polyblend compositions in Examples 37-41.

DETAILED DESCRIPTION OF THE INVENTION

The present invention is directed to novel polymer compositions comprised of polyamide resins, styrenic resins and suitable interfacial agents which improve the compatibility between the polyamide and styrenic compounds, thereby increasing the impact resistance of the resultant polymer composition.

The polymer compositions of the present invention preferably comprise from about 99 weight percent to about 1 weight percent polyamide, from about 1 weight percent to about 99 weight percent styrenic resin, and from about 1 phr to about 100 phr interfacial agent.

Most preferably, the polymer compositions of the present invention comprise from about 99 weight percent to about 25 weight percent polyamide, from about 1 weight percent to about 75 weight percent styrenic resin, from about 10 prh to about 50 phr interfacial agent. The interfacial agent is preferably comprised of either carboxy (anhydride)-containing acrylonitrile-butadiene copolymer or carboxy (anhydride)-containing styrene-olefin block copolymer.

A preferred content of carboxy or anhydride in the carboxy (anhydride)-containing acrylonitrile-butadiene copolymer is in the range of from about 0.1 weight percent to about 10 weight percent and the acrylonitrile:butadiene weight ratio is preferably in the range from about 10:90 to about 40:60. A particularly preferred composition of the carboxy (anhydride)-containing acrylonitrile-butadiene copolymer is nylon-6, nylon-6,6 or mixtures of nylon-6 and nylon-6,6.

A preferred composition of the carboxy (anhydride)-containing styrene-olefin block copolymer is one in which the carboxy or anhydride content is in the range from about 0.1 weight percent to about 10 weight percent of the copolymer. A preferred styrene:olefin weight ratio is in the range of from about 10:90 to about 40:60.

The polyamide resin used in the present invention preferably has the following formula:

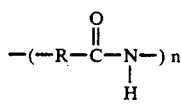

wherein R is $C_mH_{2m}$ and $m = 3\text{-}11$.

Examples of this type of polyamide include nylon-6 and nylon-6,6 which is produced from ring opening polymerization of caprolactam.

The polyamide resin of the present invention can also include polyamides having the general formula:

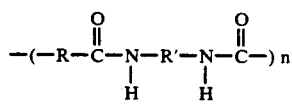

wherein R and R' are $C_mH_{2m}$ and $m = 3\text{-}11$. These polyamides are condensation polymers of dicarboxylic acids and diamines. Examples of these are nylon-6,6 which is the condensation polymer of adipic acid and hexamethylene diamine.

The polyamide resins of the instant invention can also include mixtures of polyamides, such as nylon-6 and nylon-6,6 mixtures.

The styrenic resin used in the present invention can comprise copolymers obtained from copolymerization of styrene with other double bond-containing comonomers. Examples of styrenic resins which can be employed in the present invention include, but are not limited to, styrene-acrylonitrile copolymer (SAN) produced from copolymerization of styrene and acrylonitrile in suitable ratios; impact polystyrene, produced from styrene and minor butadiene; styrene-maleic anhydride copolymer (SMA); methyl methacrylate-butadiene-styrene terpolymer (ABS) in suitable ratios of acrylonitrile:butadiene:styrene; resin obtained from copolymerization of styrene with double bond-containing polymer, including acrylonitrile-acrylic rubber-styrene resin (AAS); acrylonitrile-chlorinated polyethylene-styrene resin (ACS); and acrylonitrile-ethylene-propylene rubber-styrene resin (AES).

The present invention is also directed to a method for preparation of polyamide/styrenic resin composition which comprises the steps of mixing polyamide compositions, styrenic resin and one of the carboxy (anhydride)-containing interfacial agents in appropriate ratios as described above. The method also comprises the steps of drying the mixture and then extruding the mixture by conventional means in an extruder at a temperature in the range from about 220° C. to about 250° C. The mixture can then be pelletized by conventional means.

The following Examples show notched Izod impact strengths for various test specimens using interfacial agents, as compared to test specimens without interfacial agents. These examples are presented by way of illustration and are not intended to limit the scope of the present invention.

EXAMPLE 1

TABLE 1

| Formulation & Physical property | Effect of interfacial agent (1) on the impact strengths of Nylon/styrenic resin polyblends. | | | | | | | | | | | | | | | |
|---|---|---|---|---|---|---|---|---|---|---|---|---|---|---|---|---|
| | Compara. examples | | | | Examples | | | | | | | | | | | |
| | 1 | 2 | 3 | 4 | 1 | 2 | 3 | 4 | 5 | 6 | 7 | 8 | 9 | 10 | 11 | 12 |
| Nylon 6% | 100 | 75 | 50 | 25 | 100 | 100 | 100 | 75 | 75 | 75 | 50 | 50 | 50 | 25 | 25 | 25 |
| ABS % | 0 | 25 | 50 | 75 | 0 | 0 | 0 | 25 | 25 | 25 | 50 | 50 | 50 | 75 | 75 | 75 |
| Interfacial agent (carboxylated nitrile rubbers), phr | 0 | 0 | 0 | 0 | 10 | 30 | 50 | 10 | 30 | 50 | 10 | 30 | 50 | 10 | 30 | 50 |
| Notched Izod impact strength, ft-lb/in ⅛" 25° C. | 1.0 | 1.1 | 1.6 | 5.4 | 9.5 | 20.7 | 23.0 | 12.1 | 24.2 | 24.1 | 8.7 | 19.1 | 19.5 | 7.8 | 14.9 | 15.0 |

Note: The carboxy (anhydride) content of the interfacial agent used in this Table is 3 wt %, and its acrylonitrile content is 27%.

Table 1 shows the effects of carboxy-containing acrylonitrile-butadiene copolymer interfacial agent, namely carboxylated nitrile rubber, on the impact strengths of nylon/ABS resin polyblends. Examples 1-4 show the formulations and notched impact strengths without interfacial agent. The results demonstrate that the polyblends without interfacial agent have significantly lower notched impact strengths than the polyblends using interfacial agent, regardless of the ratio of nylon to styrenic resin.

As shown in Table 1, when the styrenic resin is ABS and the interfacial agent is a carboxylated nitrile rubber the polymwer blend composition preferably comprises 75-25 weight percent polyamide resin, 25-75 weight percent ABS resin, and 10-50 phr of carboxylated nitrile rubbers, based upon the total weight of polyamide and ABS resin.

The results in Table 1 also demonstrate that the polyblends with carboxylated nitrile rubber have significantly higher notched Izod impact strength than the poly blends without carboxylated nitrile rubber. It is believed that the simultaneous interaction of the functional group in the interfacial agent with nylon and ABS increases the compatibility between nylon and ABS, thereby greatly improving the impact strength of the polyblend.

using interfacial agent are much higher than those of the polyblend compositions without interfacial agent, shown in Table 1, Examples 1-4.

EXAMPLE 4

TABLE 4

Effect of interfacial agent (2) on the impact strengths of Nylon/styrenic resin polyblends.

|  | Comparative examples | | | | | Examples | | | | |
|---|---|---|---|---|---|---|---|---|---|---|
|  | 5 | 6 | 7 | 8 | 9 | 37 | 38 | 39 | 40 | 41 |
| Nylon 6.6 wt % | 75 | — | 75 | 75 | — | 75 | — | 75 | 75 | — |
| Nylon 6 wt % | — | 75 | — | — | 75 | — | 75 | — | — | 75 |
| ABS wt % | 25 | — | — | — | — | 25 | — | — | — | — |
| MBS wt % | — | 25 | — | — | — | — | 25 | — | — | — |
| SMA wt % | — | — | 25 | — | — | — | — | 25 | — | — |
| SAN wt % | — | — | — | 25 | — | — | — | — | 25 | — |
| HIPS wt % | 0. | — | — | — | 25 | — | — | — | — | 25 |
| Interfacial agent, phr | 0 | 0 | 0 | 0 | 0 | 30 | 30 | 30 | 30 | 30 |
| Notched impact strength, ft-lb/in ¼" 25° C. | 1.7 | 1.5 | 1.9 | 1.2 | 1.3 | 19.3 | 21.7 | 20.2 | 22.5 | 19.2 |

Note: The carboxy (anhydride) content of the interfacial agent (2) in this Table is 2 wt %, and the styrene/olefin weight ratio is 13/87.

Table 4 shows the effect of carboxy-containing styrene-olefin block copolymer interfacial agent on the impact strengths of various grades of nylon/styrenic resin polyblend compositions (Examples 37-41). The types of nylons used in Examples 37-41 include nylon-6 and nylon-6,6. The styrenic resins include ABS, MBS, SMA, SAN and HIPS. The results again show that use of the interfacial agent greatly improves the impact strength of various grades of nylon/styrenic resin polyblend compositions.

EXAMPLE 2

TABLE 2

Effect of interfacial agent (2) on the impact strengths of Nylon/styrenic resin polyblend.

| Formulation & Physical property | Examples | | | | | | | | | | | |
|---|---|---|---|---|---|---|---|---|---|---|---|---|
|  | 13 | 14 | 15 | 16 | 17 | 18 | 19 | 20 | 21 | 22 | 23 | 24 |
| Nylon 6% | 100 | 100 | 100 | 75 | 75 | 75 | 50 | 50 | 50 | 25 | 25 | 25 |
| ABS % | 0 | 0 | 0 | 25 | 25 | 25 | 50 | 50 | 50 | 75 | 75 | 75 |
| Interfacial agent, phr | 10 | 30 | 50 | 10 | 30 | 50 | 10 | 30 | 50 | 10 | 30 | 50 |
| Notched impact strength, ft-lb/in ¼" 25° C. | 12.1 | 21.2 | 22.8 | 10.9 | 19.8 | 22.6 | 12.5 | 20.1 | 21.7 | 8.1 | 13.7 | 15.9 |

Note: The carboxy (anhydride) content of the interfacial agent (2) used in this Table is 2 wt %, and the styrene/olefin weight ratio is 13/87.

Table 2 shows the effect of carboxy-containing styrene-olefin block copolymer interfacial agent on the impact strengths of nylon/styrenic resin polyblends in Examples 13-24. The polyblend compositions in these Examples have higher notched impact strengths than those of the polyblends without interfacial agent, shown in Examples 1-4 of Table 1.

EXAMPLE 3

TABLE 3

Effect of interfacial agent (2) on the impact strengths of Nylon/styrenic resin polyblend.

| Formulation & Physical property | Examples | | | | | | | | | | | |
|---|---|---|---|---|---|---|---|---|---|---|---|---|
|  | 25 | 26 | 27 | 28 | 29 | 30 | 31 | 32 | 33 | 34 | 35 | 36 |
| Nylon 6% | 100 | 100 | 100 | 75 | 75 | 75 | 50 | 50 | 50 | 25 | 25 | 25 |
| ABS % | 0 | 0 | 0 | 25 | 25 | 25 | 50 | 50 | 50 | 75 | 75 | 75 |
| Interfacial agent, phr | 10 | 30 | 50 | 10 | 30 | 50 | 10 | 30 | 50 | 10 | 30 | 50 |
| Notched impact strength, ft-lb/in ¼" 25° C. | 10.7 | 19.5 | 22.1 | 9.5 | 24.5 | 24.0 | 18.4 | 17.2 | 19.8 | 7.4 | 12.6 | 14.7 |

Note: The carboxy (anhydride) content of the interfacial agent (2) used in this Table is 6 wt %, and the styrene/olefin weight ratio is 28/72.

Table 3 shows formulations and impact strengths using interfacial agent with different carboxy content and styrene to olefin ratios from that in Tables 1 and 2 to study its effect on impact strengths of nylon/styrene resin polyblend compositions (Examples 25-36). The notched impact strengths of the polyblend compositions

We claim:

1. A polymer blend composition comprising from 75 weight percent to about 25 weight percent polyamide resin, from 25 weight percent to about 75 weight percent ABS resin, and from about 10 parts to about 50 parts per hundred resin of carboxylated nitrile rubbers, based upon the total weight of polyamide and ABS resin.

2. The polymer blend composition of claim 1 wherein said polyamide is selected from the group consisting of nylon-6, nylon-6,6, and mixtures of nylon-6 and nylon-6,6.

3. A polymer blend composition comprising from about 99 weight percent to about 1 weight percent polyamide resin, from about 1 weight percent to about 99 weight percent ABS resin, and from about 1 part to about 100 parts per hundred resin of carboxylated nitrile rubbers, based upon the total weight of polyamide and ABS resin.

4. The polymer blend composition of claim 3, wherein said carboxylated nitrile rubber has a carboxy content in the range of from about 0.1 weight percent to about 10 weight percent.

5. The polymer blend composition of claims 3 or 4, wherein the weight ratio of acrylonitrile to butadiene in said carboxylated nitrile rubbers is in the range from about 10:90 to about 40:60.

6. The polymer blend composition of claim 3 wherein said polyamide resin is selected from the group consisting of nylon-6, nylon-6,6 and mixtures of nylon-6 and nylon-6,6.

* * * * *

UNITED STATES PATENT AND TRADEMARK OFFICE
CERTIFICATE OF CORRECTION

PATENT NO. : 5,248,726
DATED : September 28, 1993
INVENTOR(S) : Lin et al.

It is certified that error appears in the above-identified patent and that said Letters Patent is hereby corrected as shown below:

Column 1, line 59, please start new paragraph beginning with "It is still . . .".

Column 2, line 12, after "composition", please insert --.--.

Column 4, line 9, after "terpolymer", please insert --(MBS); acrylonitrile-butadiene-styrene terpolymer--.

Column 4, line 61, change "polymwer" to --polymer--.

Signed and Sealed this

Twelfth Day of April, 1994

Attest:

BRUCE LEHMAN

*Attesting Officer*     Commissioner of Patents and Trademarks